US012554598B2

(12) United States Patent
Huang et al.

(10) Patent No.: US 12,554,598 B2
(45) Date of Patent: Feb. 17, 2026

(54) DATA RECOVERY METHOD, SYSTEM AND APPARATUS, AND COMPUTER-READABLE STORAGE MEDIUM AND PROGRAM PRODUCT

(71) Applicants: CHINA MOBILE (SUZHOU) SOFTWARE TECHNOLOGY CO., LTD., Jiangsu (CN); CHINA MOBILE COMMUNICATIONS GROUP CO., LTD., Beijing (CN)

(72) Inventors: Yitian Huang, Suzhou (CN); Yanshan Chen, Suzhou (CN); Hong Liu, Suzhou (CN); Kefei Li, Suzhou (CN)

(73) Assignees: CHINA MOBILE (SUZHOU) SOFTWARE TECHNOLOGY CO., LTD., Jiangsu (CN); CHINA MOBILE COMMUNICATIONS GROUP CO., LTD., Beijing (CN)

( * ) Notice: Subject to any disclaimer, the term of this patent is extended or adjusted under 35 U.S.C. 154(b) by 0 days.

(21) Appl. No.: 18/849,626

(22) PCT Filed: Mar. 20, 2023

(86) PCT No.: PCT/CN2023/082611
§ 371 (c)(1),
(2) Date: Sep. 23, 2024

(87) PCT Pub. No.: WO2023/179569
PCT Pub. Date: Sep. 28, 2023

(65) Prior Publication Data
US 2025/0208955 A1 Jun. 26, 2025

(30) Foreign Application Priority Data
Mar. 25, 2022 (CN) .......................... 202210305712.9

(51) Int. Cl.
G06F 11/14 (2006.01)
G06F 11/1446 (2026.01)

(52) U.S. Cl.
CPC ...... *G06F 11/1469* (2013.01); *G06F 2201/84* (2013.01)

(58) Field of Classification Search
CPC .... G06F 11/1469; G06F 2201/84; G06F 3/06; G06F 16/16; G06F 3/0652; G06F 16/162
See application file for complete search history.

(56) References Cited

U.S. PATENT DOCUMENTS 10,803,012 B1 10/2020 Madhavarapu
2016/0188219 A1* 6/2016 Peterson ............. G06F 12/0246
711/103

FOREIGN PATENT DOCUMENTS

CN 103080911 A 5/2013
CN 105512049 A 4/2016
(Continued)

OTHER PUBLICATIONS

International Search Report in the international application No. PCT/CN2023/082611, mailed on Jun. 7, 2023, 3 pages.
(Continued)

*Primary Examiner* — Apu M Mofiz
*Assistant Examiner* — Cindy Nguyen
(74) *Attorney, Agent, or Firm* — Cooper Legal Group, LLC

(57) ABSTRACT

Disclosed in the embodiments of the present application are a data recovery method, system and apparatus, and a computer-readable storage medium and a program product. The method comprises: in the current scheduling period, acquiring use information of a storage unit in a storage unit cluster, wherein the use information comprises a recovery state and a historical recovery time; on the basis of the recovery state, determining, from the storage unit cluster, at least one first storage unit which is not in a data recovery state; when the recovery state represents being in the data recovery state, determining, to be a second storage unit, the storage unit corresponding to the recovery state; on the basis of the historical recovery time, determining a target storage unit from the at least one first storage unit; stopping a data processing service of the target storage unit, executing a data recovery operation by means of the target storage unit, and updating the recovery state of the target storage unit; and stopping a data recovery operation of the second storage unit, and recovering the data processing service of the (Continued)

second storage unit. By means of the present solution, the garbage recycling efficiency and the storage cluster performance can be improved.

17 Claims, 7 Drawing Sheets

(56) References Cited

FOREIGN PATENT DOCUMENTS

| | | |
|---|---|---|
| CN | 109496300 A | 3/2019 |
| CN | 110018966 A | 7/2019 |
| CN | 110716690 A | 1/2020 |
| CN | 110968417 A | 4/2020 |
| CN | 111444015 A | 7/2020 |
| CN | 111768297 A | 10/2020 |
| CN | 112463069 A | 3/2021 |
| CN | 112540968 A | 3/2021 |
| CN | 112650694 A | 4/2021 |
| WO | 2018086075 A1 | 5/2018 |

OTHER PUBLICATIONS

English translation of the Written Opinion of the International Search Authority in the international application No. PCT/CN2023/082611, mailed on Jun. 7, 2023, 3 pages.

\* cited by examiner

DATA RECOVERY METHOD, SYSTEM AND APPARATUS, AND COMPUTER-READABLE STORAGE MEDIUM AND PROGRAM PRODUCT

CROSS-REFERENCE TO RELATED APPLICATION

This application is filed based on and claims priorities to Chinese patent application No. 202210305712.9 filed on Mar. 25, 2022 and entitled "METHOD, SYSTEM AND APPARATUS FOR DATA COLLECTION, AND COMPUTER-READABLE STORAGE MEDIUM", the disclosure of which is hereby incorporated by reference in its entirety.

TECHNICAL FIELD

The disclosure relates to the field of infrastructures, and in particular to a method, system and apparatus for data collection, a computer-readable storage medium, and a program product.

BACKGROUND

When a user uses a product developed based on distributed storage (such as a network disk or object storage), the user's deletion operation is one of the most common operations. In an actual engineering implementation corresponding to the deletion operation, a storage system usually does not immediately clear files that the user wants to delete from the disk completely, since too many deletion operations may affect performance of the whole system. Therefore, in general, with respect to the user's deletion operation, a common processing method for the storage system is to mark each of the files that the user wants to delete as a "deleted" state, to make the files invisible to the user, so as to delete the files from the user's perspective. Further, the storage system may record the files with states of "deleted" while still present on the storage medium actually. After a grace time expires, the storage system may delete these files at a predetermined time (such as the early morning when access traffic is small) or a uniform time interval (such as every hour), thereby truly releasing storage space of the storage system, to implement Garbage Collection (GC) in the distributed storage system.

However, the above GC process is usually performed spontaneously on a storage logical unit, which is inconvenient to perform progress management uniformly; and the GC process consumes system resources greatly. When the storage logical unit performs the GC process, it is easy to affect data service performance of the whole storage cluster, thereby reducing performance of the storage cluster and GC efficiency.

SUMMARY

Embodiments of the disclosure provide a method, system and apparatus for data collection, a computer-readable storage medium, and a program product, which may improve the GC efficiency and the performance of the storage cluster.

Technical solutions of the disclosure are implemented as follows.

An embodiment of the disclosure provides a method for data collection, the method includes the following operations.

Use information of storage units in a storage unit cluster is acquired within a current scheduling period, here the use information includes a collection state and a historical collection time.

At least one first storage unit which is not in a data collection state from the storage unit cluster is determined based on the collection state.

Storage units corresponding to the collection state are determined as second storage units, in case that the collection state indicates that the storage units are in the data collection state.

A target storage unit is determined from the at least one first storage unit, based on the historical collection time.

A data processing service for the target storage unit is stopped, a data collection operation is performed by the target storage unit, and a collection state of the target storage unit is updated.

Data collection operations of the second storage units are stopped, and data processing services of the second storage units are recovered.

An embodiment of the disclosure provides a system for data collection, the system for data collection includes a control unit and a storage unit cluster, the control unit is connected to storage units in the storage unit cluster through a preset interface.

The control unit is configured to: acquire use information of the storage units in the storage unit cluster within a current scheduling period, here the use information includes a collection state and a historical collection time; determine at least one first storage unit which is not in a data collection state from the storage unit cluster, based on the collection state; determine storage units corresponding to the collection state as second storage units, in case that the collection state indicates that the storage units are in the data collection state; determine a target storage unit from the at least one first storage unit, based on the historical collection time; send a data collection instruction to the target storage unit via the preset interface, and update a collection state of the target storage unit; and send a collection stopping instruction to the second storage units via the preset interface, and recover data processing services of the second storage units.

The storage units are configured to: stop the data processing service, and perform a data collection operation, in case that the data collection instruction is received; and stop the data collection operation, and start the data processing service accordingly, in case that the collection stopping instruction is received.

An embodiment of the disclosure provides an apparatus for data collection, the apparatus for data collection includes an acquisition unit, a determination unit, a data collection unit, and a recovery unit.

The acquisition unit is configured to acquire use information of storage units in a storage unit cluster within a current scheduling period, here the use information includes a collection state and a historical collection time.

The determination unit is configured to: determine at least one first storage unit which is not in a data collection state from the storage unit cluster, based on the collection state; determine storage units corresponding to the collection state as second storage units, in case that the collection state indicates that the storage units are in the data collection state; and determine a target storage unit from the at least one first storage unit, based on the historical collection time.

The data collection unit is configured to stop a data processing service for the target storage unit, perform a data collection operation by the target storage unit, and update a collection state of the target storage unit.

The recovery unit is configured to stop data collection operations of the second storage units, and recover data processing services of the second storage units.

In the above apparatus, the determination unit may be further configured to: take the first storage unit of which the historical collection time is empty, as the target storage unit, here the historical collection time indicates a time when the data collection operation was performed last time; and determine the target storage unit from the at least one first storage unit based on at least one of the storage unit load, the to-be-collected data amount, or the storage unit usage, in case that the historical collection time of the at least one first storage unit is not empty.

In the above apparatus, the determination unit may be further configured to: perform a weighted summation on at least one of the storage unit load, the to-be-collected data amount, or the storage unit usage according to a preset weight, to obtain a weighted value of each of the at least one first storage unit; and determine the target storage unit from the at least one first storage unit according to the weighted value of each of the at least one first storage unit.

In the above apparatus, the determination unit may be further configured to: take first storage units with a maximum weighted value from the at least one first storage unit as candidate storage units, in case that a number of the first storage units with the maximum weighted value is greater than a preset number threshold; and determine the target storage unit based on historical collection times of the candidate storage units.

In the above apparatus, the determination unit may be further configured to: calculate difference values between the historical collection times of the candidate storage units and a current time; and determine the target storage unit from the candidate storage units, based on the difference values.

In the above apparatus, the recovery unit may be further configured to: send a collection stopping instruction to the second storage units through a first preset interface, so that the second storage units stop the data collection operations; update a collection state of at least one of the second storage units as being not in the data collection state, and update a historical collection time of at least one of the second storage units; and recover the data processing services of the second storage units.

In the above apparatus, the determination unit may be further configured to determine the storage units as first storage units in case that the collection state indicates being not in the data collection state, the operation state indicates an normal operation, and the to-be-collected data amount is greater than a preset data amount threshold, so that the at least one first storage unit is determined.

In the above apparatus, the data collection unit may be further configured to: send a data collection instruction to the target storage unit through a second preset interface, to stop the data processing service for the target storage unit, and perform the data collection operation by the target storage unit; and update the collection state of the target storage unit as being in the data collection state.

In the above apparatus, the data collection unit may be further configured to enter a next scheduling period after a preset waiting time expires, and perform data collection processes on the storage unit cluster through the next scheduling period, to implement data collection scheduling for the storage unit cluster through at least one scheduling period.

An embodiment of the disclosure provides an apparatus for data collection, the apparatus for data collection includes a memory and a processor.

The memory is configured to store executable instructions.

The processor is configured to execute the executable instructions stored in the memory, and execute the method for data collection applied to a terminal when the executable instructions are executed.

An embodiment of the disclosure provides a storage medium, the storage medium has stored thereon executable instructions that are configured to when executed, enable a processor to execute the method for data collection described in the embodiments of the disclosure.

An embodiment of the disclosure provides a computer program product, the computer program product includes a computer program or instructions that when executed by a processor, implements or implement the method for data collection provided in the embodiments of the disclosure.

The embodiments of the disclosure provide a method, system and apparatus for data collection, a computer-readable storage medium, and a program product. The method includes the following operations. Use information of storage units in a storage unit cluster is acquired within a current scheduling period, here the use information includes a collection state and a historical collection time. At least one first storage unit which is not in a data collection state from the storage unit cluster is determined based on the collection state. Storage units corresponding to the collection state are determined as second storage units, in case that the collection state indicates that the storage units are in the data collection state. A target storage unit is determined from the at least one first storage unit, based on the historical collection time. A data processing service for the target storage unit is stopped, a data collection operation is performed by the target storage unit, and a collection state of the target storage unit is updated. Data collection operations of the second storage units are stopped, and data processing services of the second storage units are recovered. In the above solution, the target storage unit and the second storage units are determined according to the collection state within the current scheduling period. After the data processing service for the target storage unit is stopped, the data collection operation may be performed by the target storage unit using its full-load resources. Subsequently, the data service of the storage unit may be recovered according to the collection state, thereby achieving unified scheduling of data collection operations of the storage units, making full use of system resources of the target storage unit, and improving the GC efficiency; furthermore, it may reduce effect on data service performance of the storage cluster when the target storage unit performs the GC operation, thereby improving performance of the storage cluster too.

It should be understood that the above general descriptions and the following detailed descriptions are only exemplary and explanatory, and are not intended to limit the disclosure.

DETAILED DESCRIPTION

The technical solutions in the embodiments of the disclosure will be clearly and completely described below with reference to the drawings in the embodiments of the disclosure. It is apparent that the described embodiments are only a part of the embodiments of the disclosure, rather than all of the embodiments. Based on the embodiments of the disclosure, all other embodiments obtained by those of ordinary skill in the art without paying any creative work fall within the scope of protection of the disclosure.

Figure 1:
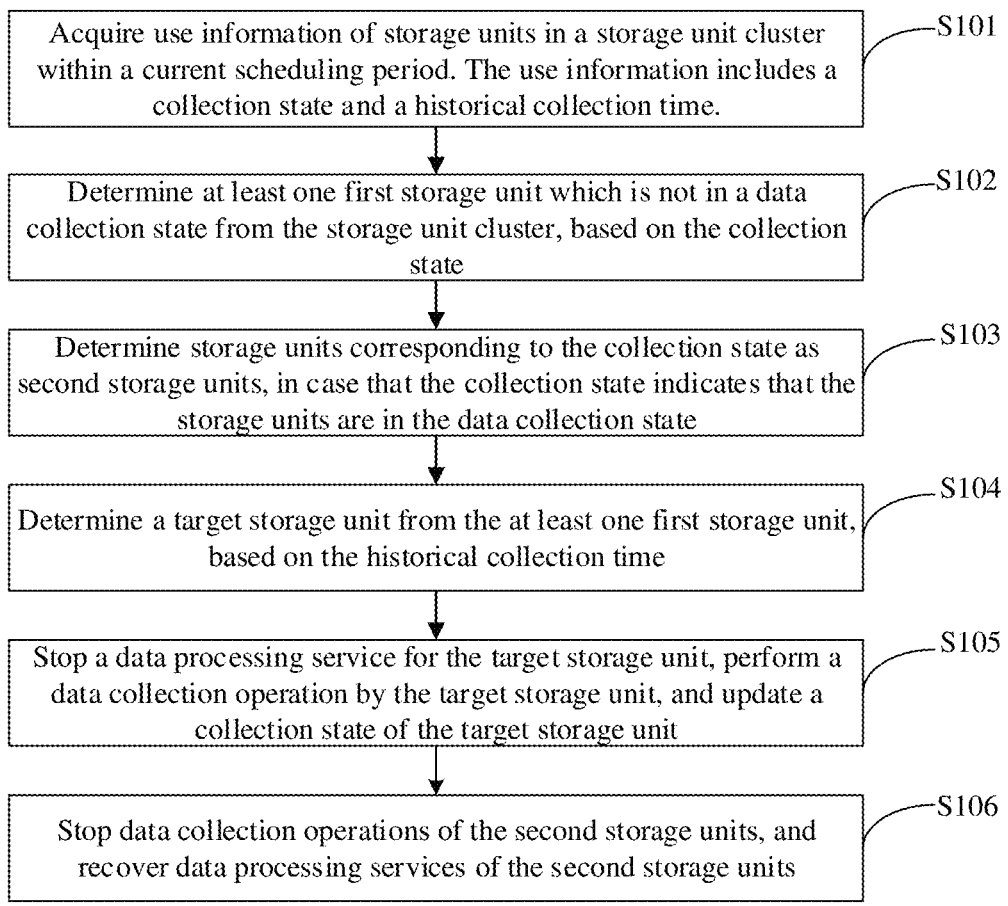
FIG. 1 is a first schematic flowchart of a method for data collection provided in an embodiment of the disclosure.

In order to enable those skilled in the art to understand the solutions of the disclosure better, the disclosure will be further described in detail below with reference to the drawings and specific implementations. Methods in the embodiments of the disclosure may be executed by an apparatus for data collection. In some embodiments, the apparatus for data collection may be a terminal or a server. FIG. 1 is a first schematic flowchart of a method for data collection provided in an embodiment of the disclosure, which will be described with reference to operations shown in FIG. 1.

In operation S101, use information of storage units in a storage unit cluster is acquired within a current scheduling period, here the use information includes a collection state and a historical collection time.

In the embodiment of the disclosure, the use information of storage units in the storage unit cluster is acquired within the current scheduling period, here the use information includes the collection state and the historical collection time.

In the embodiment of the disclosure, a control unit gathers the use information of all the storage units in the storage unit cluster within the current scheduling period. The use information includes the collection state and the historical collection time. The collection state includes an ongoing Garbage Collection (GC) operation and a no-collection operation. Garbage, that is, data operation information of the storage unit may be determined from the collection state. The historical collection time includes a time when a GC operation was performed by the storage unit last time.

In the embodiment of the disclosure, the storage unit refers to a logical storage unit with functions of storing data and reading and writing data. In some embodiments, the operation S101 may be performed by the control unit connected to the storage unit through an interface. The control unit may control the storage unit to perform some operations through the interface. Exemplarily, the control unit may send a GC instruction to control the storage unit to perform the GC operation. The control unit may statistically calculate a GC state of the whole cluster through instructions and by gathering cluster state information.

In operation S102, at least one first storage unit which is not in a data collection state from the storage unit cluster is determined based on the collection state.

In the embodiment of the disclosure, at least one first storage unit which is not in the data collection state is determined from the storage unit cluster according to gathered collection states of the storage units.

In the embodiment of the disclosure, it is determined whether the storage unit is in a data collection operation according to the collection state of the storage unit, and the storage unit which is not in the data collection operation is determined as the first storage unit.

In operation S103, storage units corresponding to the collection state are determined as second storage units, in case that the collection state indicates that the storage units are in the data collection state.

In some embodiments of the disclosure, storage units which are in the data collection operation are determined as the second storage units according to collection states of the storage units.

In operation S104, a target storage unit is determined from the at least one first storage unit, based on the historical collection time.

In the embodiment of the disclosure, the target storage unit is determined from at least one storage unit by determining the historical collection time of the storage unit.

In the embodiment of the disclosure, the target storage unit is a storage unit which needs to perform data collection, and there may be one or multiple target storage units.

In operation S105, a data processing service for the target storage unit is stopped, a data collection operation is performed by the target storage unit, and a collection state of the target storage unit is updated.

In the embodiment of the disclosure, after the target storage unit stops the data processing service, the data collection operation is performed on the target storage unit, and the collection state of the target storage unit is updated.

In the embodiment of the disclosure, the data processing service for the target storage unit is paused, that is, the target storage unit is temporarily removed from the cluster, and then the data collection operation is performed on the removed target storage unit, and the collection state of the target storage unit is updated, that is, indicating that the target storage unit is performing the data collection operation.

In operation S106, data collection operations of the second storage units are stopped, and data processing services of the second storage units are recovered.

In the embodiment of the disclosure, the second storage units stop the data collection operations, and the data processing services of the second storage units are recovered.

In the embodiment of the disclosure, the second storage units stop the data collection operations, and the second storage units after stopping the data collection operations are rejoined to the storage unit cluster, to perform the data processing services.

It may be understood that in the embodiment of the disclosure, the use information of the storage units in the cluster are gathered, and then first storage units and second storage units are determined according to the collection states of the storage units in the use information, and the target storage unit is determined from the first storage units according to the historical collection time, and finally, after the data processing service for the target storage unit is stopped (that is, the target storage unit is removed from the cluster), the data collection operation is performed on the target storage unit. On one hand, removal or addition of storage units is a very common operation for the distributed storage system and does not affect performance of the cluster substantially. On the other hand, since the storage unit has been removed from the cluster during data (garbage) collection, it is unnecessary to consider performance effect of data collection on the storage unit at this time. Therefore, in this period of time, the storage unit may perform full-load data collection, that is, occupy system resources as much as possible, to perform data collection, so that more storage space may be released.

In some embodiments of the disclosure, the operation S104 may be implemented through operations S1041 and S1042, which will be described with reference to the following operations.

In operation S1041, the first storage unit of which the historical collection time is empty, is taken as the target storage unit, here the historical collection time indicates a time when the data collection operation was performed last time.

In some embodiments of the disclosure, after the first storage unit is determined, the historical collection time of the first storage unit is checked. The historical collection time indicates a time when the storage unit performed the data collection operation last time. Therefore, the first storage unit is taken as the target storage unit.

In some embodiments of the disclosure, if historical time of the first storage unit is empty, it indicates that the first storage unit has not performed the GC operation.

In operation S1042, the target storage unit is determined from the at least one first storage unit based on at least one of a storage unit load, a to-be-collected data amount, or a storage unit usage, in case that the historical collection time of the at least one first storage unit is not empty.

In some embodiments of the disclosure, if the historical collection time of at least one first storage unit from multiple storage units is not empty, the target storage unit is determined from the at least one first storage unit based on at least one of the storage unit load, the to-be-collected data amount, or the storage unit usage.

In some embodiments of the disclosure, if there is only one first storage unit of which historical time is empty, the first storage unit is directly determined as the target storage unit; if there are two or more first storage units of which historical times are empty respectively, the target storage unit is determined from the two or more storage units according to at least one of the storage unit load, the to-be-collected data amount, or the storage unit usage.

In some embodiments of the disclosure, the target storage unit may also be determined from the two or more storage units according to at least one of a load percentage of a current storage unit, a percentage of the to-be-collected data amount to a total data amount, or a percentage of the storage unit usage to a total storage capacity.

It may be understood that in some embodiments of the disclosure, the first storage unit of which the historical collection time is empty, is determined as the target storage unit; if the historical time is not empty, the target storage unit is determined from the at least one first storage unit according to at least one of the storage unit load, the to-be-collected data amount, or the storage unit usage. This allows the storage units to occupy system resources in an ordered and reasonable manner, to perform data collection.

Figure 2:
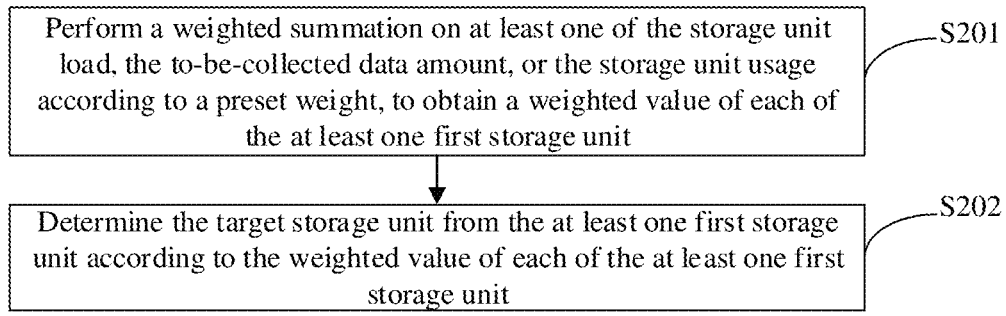
FIG. 2 is a second schematic flowchart of a method for data collection provided in an embodiment of the disclosure.

In some embodiments of the disclosure, as shown in FIG. 2, which is a second schematic flowchart of a method for data collection provided in an embodiment of the disclosure, the operation S1042 may be implemented through operations S201 and S202, which will be described with reference to the following operations.

In operation S201, a weighted summation is performed on at least one of the storage unit load, the to-be-collected data amount, or the storage unit usage according to a preset weight, to obtain a weighted value of each of the at least one first storage unit.

In some embodiments of the disclosure, the weighted value of each of the at least one first storage unit is calculated based on at least one of the storage unit load, the to-be-collected data amount, or the storage unit usage, in combination with the preset weight.

In some embodiments of the disclosure, when there are two or more first storage units, a weight corresponding to the storage unit load may be set to 0.3, a weight corresponding to the to-be-collected data amount may be set to 0.5, and a weight corresponding to the storage unit usage may be set to 0.2. When the weighted value of the first storage unit is calculated, only one of the storage unit load, the to-be-collected data amount and the storage unit usage may be used in combination with the weight corresponding thereto, that is, weights of the remaining two factors are temporarily set to 0, to calculate the weighted value of each of the first storage units. For example, the weight corresponding to the to-be-collected data amount may be set to 0.5, the weight corresponding to the storage unit usage and the weight corresponding to the storage unit load may be set to 0, to calculate weighted values of the two or more first storage units.

In some embodiments of the disclosure, any two factors from the storage unit load, the to-be-collected data amount and the storage unit usage may also be used in combination with weights corresponding thereto, that is, the weight corresponding to the remaining factor is set to 0, to calculate the weighted value of each of the first storage units. For example, the weight corresponding to the storage unit load may be set to 0.3, the weight corresponding to the to-be-collected data amount may be set to 0.5, and the weight corresponding to the storage unit usage may be set to 0, to calculate weighted values of the storage units.

In some embodiments of the disclosure, the weighted values of the storage units may also be calculated by simultaneously using the storage unit load, the to-be-collected data amount and the storage unit usage, in combination with weights corresponding thereto.

In some embodiments of the disclosure, the weighted values of the storage units may also be calculated according to at least one of the load percentage of the current storage unit, the percentage of the to-be-collected data amount to the total data amount, or the percentage of the storage unit usage to the total storage capacity, in combination with weights corresponding thereto.

In operation S202, the target storage unit is determined from the at least one first storage unit according to the weighted value of each of the at least one first storage unit.

In some embodiments of the disclosure, the target storage unit is determined from at least one first storage unit according to the calculated weighted value of each first storage unit.

In some embodiments of the disclosure, after the weighted value of each first storage unit is calculated, weighted values are sorted to select the first storage unit with a maximum weighted value and determine this first storage unit as the target storage unit.

In some embodiments of the disclosure, a threshold may be set, weighted values greater than the threshold are used as candidate values, the candidate values are sorted to select the maximum weighted value, and the first storage unit corresponding to the maximum weighted value is determined as the target storage unit.

It may be understood that in some embodiments of the disclosure, the weighted summation is performed on at least one of the storage unit load, the to-be-collected data amount, or the storage unit usage according to the preset weight, to obtain the weighted value of each of the first storage units, and the final target storage unit is determined according to the weighted value, which allows the storage units to further occupy system resources in an ordered and reasonable manner, to perform data collection.

Figure 3:
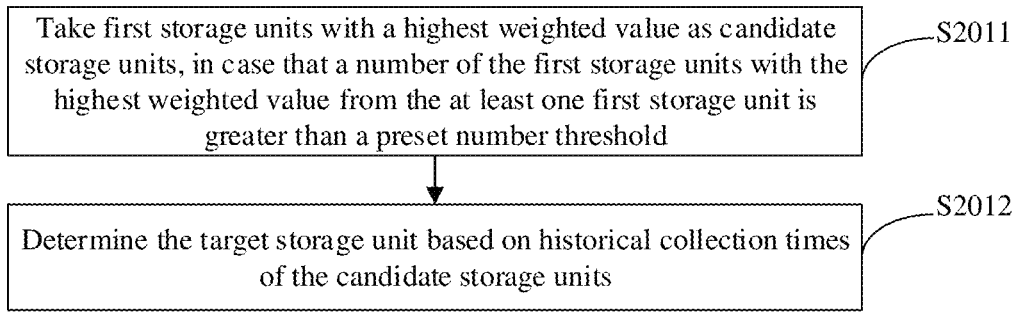
FIG. 3 is a third schematic flowchart of a method for data collection provided in an embodiment of the disclosure.

In some embodiments of the disclosure, as shown in FIG. 3, which is a third schematic flowchart of a method for data collection provided in an embodiment of the disclosure, the operation S201 may be implemented through operations S2011 and S2012, which will be described with reference to the following operations.

In operation S2011, first storage units with a maximum weighted value from the at least one first storage unit are taken as candidate storage units, in case that a number of the first storage units with the maximum weighted value is greater than a preset number threshold.

In some embodiments of the disclosure, if the number of the first storage units with the maximum weighted value from at least one first storage unit is greater than the preset number threshold, that is, there are multiple first storage units with an equal and maximum weighted value at the same time, multiple first storage units are taken as the candidate storage units.

In some embodiments, the preset number threshold may be 1, or may be set according to actual requirements. Specifically, it may be selected according to actual situations, which is not limited in the embodiments of the disclosure.

In operation S2012, the target storage unit is determined based on historical collection times of the candidate storage units.

In some embodiments of the disclosure, after multiple candidate storage units are obtained, the target storage unit is determined according to historical collection times of multiple candidate storage units.

Figure 4:
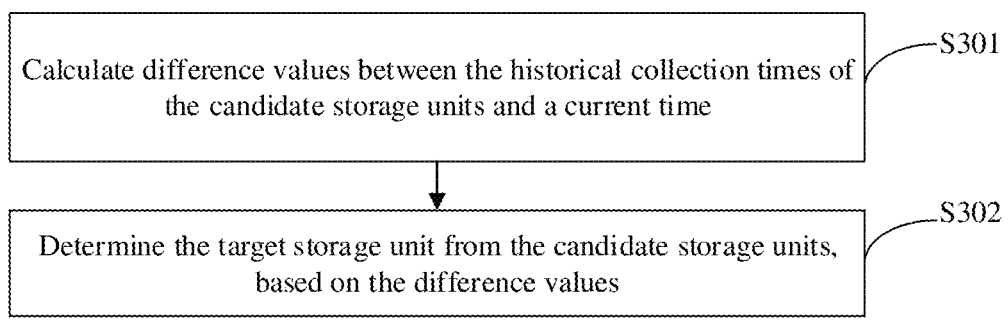
FIG. 4 is a fourth schematic flowchart of a method for data collection provided in an embodiment of the disclosure.

In some embodiments of the disclosure, as shown in FIG. 4, which is a fourth schematic flowchart of a method for data collection provided in an embodiment of the disclosure, the operation S2012 may be implemented through operations S301 and S302, which will be described with reference to the following operations.

In operation S301, difference values between the historical collection times of the candidate storage units and a current time are calculated.

In some embodiments of the disclosure, the historical collection times of the candidate storage units are acquired, that is, times when the candidate storage units performed the data collection operation last time, and the difference values are calculated by using the times when the candidate storage units performed the data collection operation last time and a current scheduling time.

In some embodiments of the disclosure, each of the candidate storage units corresponds to a respective one of the difference values.

In operation S302, the target storage unit is determined from the candidate storage units, based on the difference values.

In some embodiments of the disclosure, after the difference value corresponding to each of the candidate storage units is calculated, difference values are sorted to find a maximum difference value, and the candidate storage unit corresponding to the maximum difference value is determined as the target storage unit.

In some embodiments of the disclosure, one or more candidate storage units with difference values greater than a preset difference threshold may also be determined as target storage units. The number of target storage units may be set according to actual situations of the storage cluster. For example, removal of a corresponding number of target storage units may not seriously affect data service performance of the storage cluster. Specifically, it may be selected according to actual situations, which is not limited in the embodiments of the disclosure.

It may be understood that in some embodiments of the disclosure, when weighted values of multiple candidate storage units are the maximum and equal, the target storage unit is determined to perform the data collection operation by calculating the difference values between the historical collection times of the candidate storage units and the current time. The storage unit, that is, the target storage unit which needs to perform the data collection operation may be accurately located, thereby improving collection efficiency.

In some embodiments of the disclosure, the operation S106 may be implemented through operations S1061 to S1063, which will be described with reference to the following operations.

In operation S1061, a collection stopping instruction is sent to the second storage units through a first preset interface, so that the second storage units stop the data collection operations.

In some embodiments of the disclosure, the control unit sends the collection stopping instruction to the second storage units through the first preset interface, so that the second storage units stop the data collection operations.

In some embodiments of the disclosure, the second storage units are storage units which are in the data collection operation.

In operation S1062, a collection state of at least one of the second storage units is updated as being not in the data collection state, and a historical collection time of at least one of the second storage units is updated.

In some embodiments of the disclosure, collection of at least one of the second storage units is updated as being not in the data collection state, and the historical collection time of at least one of the second storage units is updated.

In operation S1063, the data processing services of the second storage units are recovered.

In some embodiments of the disclosure, recovering the data processing services of the second storage units means rejoining the second storage units with changed data collection states to the cluster.

In some embodiments of the disclosure, sequences of operations S1062 and S1063 are not limited.

In some embodiments of the disclosure, the operation S102 may be implemented through operation S1021, which will be described with reference to the following operations.

In operation S1021, the storage units are determined as first storage units in case that the collection state indicates being not in the data collection state, an operation state indicates an normal operation, and the to-be-collected data amount is greater than a preset data amount threshold, so that the at least one first storage unit is determined; the use information further includes the operation state.

In some embodiments of the disclosure, the storage units which may normally operate at present and need to perform the data collection operation, are determined according to the operation state contained in the use information, and then collection states of the storage units are checked, to find storage units which are not in the data collection state and name the found storage units as the first storage units, thereby determining at least one first storage unit.

It may be understood that in some embodiments of the disclosure, storage units which are normal and need to perform GC are determined from the storage unit cluster, to perform the data collection operation, so that system resources may be effectively utilized.

In some embodiments of the disclosure, the operation S105 may be implemented through operation S1051 and S1052, which will be described with reference to the following operations.

In operation S1051, a data collection instruction is sent to the target storage unit through a second preset interface, to stop the data processing service for the target storage unit, and perform the data collection operation by the target storage unit.

In some embodiments of the disclosure, the control unit sends the data collection instruction to the target storage unit through the second preset interface, so that the target storage unit stops the data processing service, and the data collection operation is performed by the target storage unit.

In some embodiments of the disclosure, the target storage unit stopping the data processing service means removing the target storage unit from the storage unit cluster temporarily.

In some embodiments of the disclosure, the first preset interface may be the same as or different from the second preset interface.

In operation S1052, the collection state of the target storage unit is updated as being in the data collection state.

In some embodiments of the disclosure, updating the collection state of the target storage unit as being in the data collection state, indicates that the target storage unit is performing the data collection operation.

It may be understood that in some embodiments of the disclosure, the data collection instruction is sent to the target storage unit via an interface, to stop the data processing service for the target storage unit, and perform the data collection operation by the target storage unit. After the target storage unit is removed from the cluster, the data collection operation is performed, so that the target storage unit performs the data collection operation by using its full-load resources, improving the GC efficiency; furthermore, it may reduce effect on the data service performance of the storage cluster when the target storage unit performs the GC operation, thereby improving performance of the storage cluster too.

In some embodiments of the disclosure, an operation S401 is further included, as follows.

In operation S401, a next scheduling period enters after a preset waiting time expires, and data collection processes are performed on the storage unit cluster through the next scheduling period, to implement data collection scheduling for the storage unit cluster through at least one scheduling period.

In some embodiments of the disclosure, the next scheduling period enters after the preset waiting time expires, and GC processes are performed on the storage unit cluster through the next scheduling period, to implement data collection scheduling for the storage unit cluster through at least one scheduling period.

In some embodiments of the disclosure, from entering the next scheduling period after the preset waiting time expires, and performing data collection processes on the storage unit cluster through the next scheduling period, to implement data collection scheduling for the storage unit cluster through at least one scheduling period, it may be seen that an algorithm for determining the target storage unit in the disclosure is a polling algorithm in essence, which ensures that each storage unit may complete at least one GC after a certain period of time. Furthermore, GC scheduling is not affected by time. Generally speaking, business traffic is at a low point in the early morning. Then, during scheduling, the control unit may appropriately increase the number of storage units performing GC between 00:00 and 02:00.

It may be understood that in the embodiment of the disclosure, the next scheduling period enters after the preset waiting time expires, and data collection processes are performed on the storage unit cluster through the next scheduling period, to implement data collection scheduling for the storage unit cluster through at least one scheduling period. It is ensured that each storage unit may complete at least one GC after a certain period of time, so that each storage unit may complete at least one GC after a certain period of time.

Figure 5:
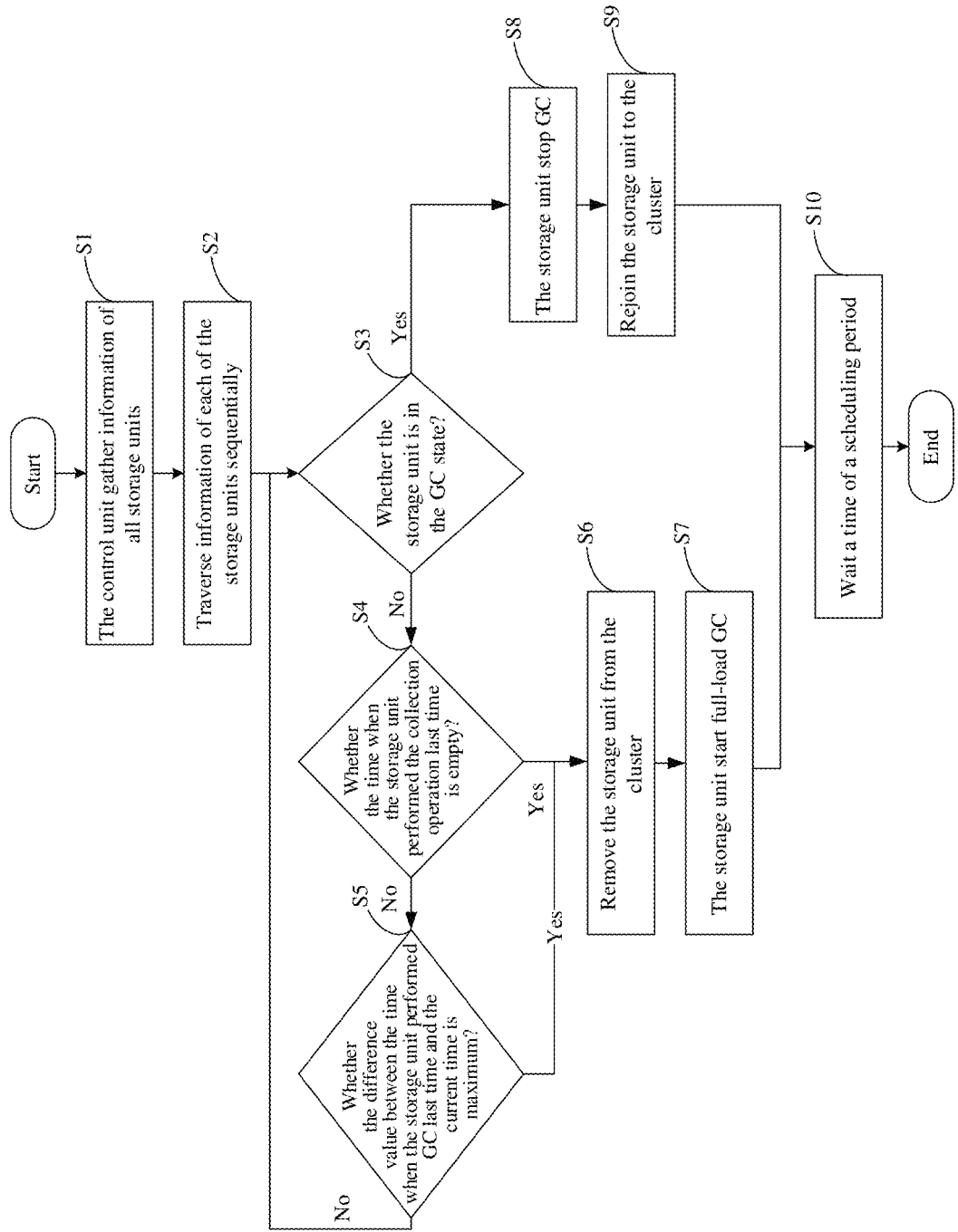
FIG. 5 is a fifth schematic flowchart of a method for data collection provided in an embodiment of the disclosure.

An embodiment of the disclosure provides a method for data collection, which may be applied to an actual scenario where GC is performed in a storage cluster, the storage cluster may contain multiple storage units, and each of the storage units is connected to a control unit through an interface. The method is shown in FIG. 5.

In operation S1, the control unit gathers information of all storage units.

In operation S2, information of each of the storage units is traversed sequentially.

In operations S1 and S2, the control unit gathers use information of all the storage units in the whole cluster at first. These information includes: whether the storage unit operates normally, whether the storage unit needs to perform GC, a time when the storage unit performed a GC operation last time (empty, if the storage unit never performed the GC operation), whether the storage unit is in a GC state at present.

In operation S3, it is determined whether the storage unit is in the GC state. If yes, operation S8 is performed; if no, operation S4 is performed.

In operation S4, it is determined whether the time when the storage unit performed the collection operation last time is empty. If yes, operation S6 is performed; if no, operation S5 is performed.

In operations S2 to S4, after analysis, the control unit selects a storage unit from units which operate normally and need to perform GC, temporarily removes the storage unit from the data cluster, and updates state information of the storage unit as ongoing GC; while the control unit controls the storage unit to perform full-load GC operations. In some embodiments, if a time when a certain storage unit performed the GC operation last time is empty, it indicates that the storage unit never performed the GC operation, and the storage unit is selected as the storage unit which needs to perform the GC operation, that is, the first storage unit.

In operation S5, it is determined whether the difference value between the time when the storage unit performed GC last time and the current time is maximum. If yes, operation S6 is performed; if no, operation S3 is performed.

In operation S5, if all the storage units have performed at least one GC operation, a current load percentage of the storage unit and weight corresponding thereto (such as 0.3) are calculated, a percentage of a number of objects for which GC will be performed to a total number of objects and weight corresponding thereto (such as 0.5) are calculated, and a percentage of usage of the current storage unit to the total storage capacity and weight corresponding thereto (such as 0.2) are calculated, the storage unit with a maximum weighted value is selected as the target storage unit. If maximum weighted values are equal and there is more than one maximum weighted values, the unit for which the difference value between the time when the GC operation was performed last time and the current time is maximum, is selected as the target storage unit.

In operation S6, the storage unit is removed from the cluster.

In operation S6, the control unit temporarily removes the target storage unit from the data cluster, and updates state information of the target storage unit as ongoing GC.

In operation S7, the storage unit starts to collect garbage with full-load, and then operation S10 is performed.

In operation S6, the storage unit may perform the GC operation by using full-load resources.

In operation S8, the storage unit stops GC.

In operation S9, the storage unit is rejoined to the cluster, and then operation S10 is performed.

In operation S9, after analysis the control unit finds storage units which performed the GC operation in the previous round, through information on whether the storage units are in the GC state, and takes the storage units as the second storage units. The control unit controls the second storage unit to stop the GC operation and rejoin the second storage unit to the data cluster, while the control unit updates information on the time when the second storage unit performed the GC operation last time, cancels the state where the second storage unit is in GC, and recovers use of the second storage unit.

In operation S10, a time of a scheduling period waits.

In operation S10, the control unit waits the time of a scheduling period, and returns to operation S1 to restart the method.

It may be understood that in the embodiment of the disclosure, the use information of all the storage units in the cluster are gathered, and then the storage unit which needs to perform the GC operation is determined according to the use information, and the storage unit is temporarily removed from the cluster, and the GC operation is performed after removal. In a period of time from selecting a certain storage unit to start to perform GC to ending of GC, the unit is removed from the cluster. At this time, no matter what operation is performed on the storage unit, it may not affect the whole cluster, and the GC efficiency is improved.

An embodiment of the disclosure provides a system for data collection, the system for data collection includes a control unit and a storage unit cluster, the control unit is connected to storage units in the storage unit cluster through a first preset interface and a second preset interface.

The control unit is configured to: acquire use information of the storage units in the storage unit cluster within a current scheduling period, here the use information includes a collection state and a historical collection time; determine at least one first storage unit which is not in a data collection state from the storage unit cluster, based on the collection state; determine storage units corresponding to the collection state as second storage units, in case that the collection state indicates that the storage units are in the data collection state; determine a target storage unit from the at least one first storage unit, based on the historical collection time; send a data collection instruction to the target storage unit via the preset interface, and update a collection state of the target storage unit; and send a collection stopping instruction to the second storage units via the preset interface, and recover data processing services of the second storage units.

The storage units are configured to: stop the data processing service, and perform a data collection operation, in case that the data collection instruction is received; and stop the data collection operation, and start the data processing service accordingly, in case that the collection stopping instruction is received.

Figure 6:
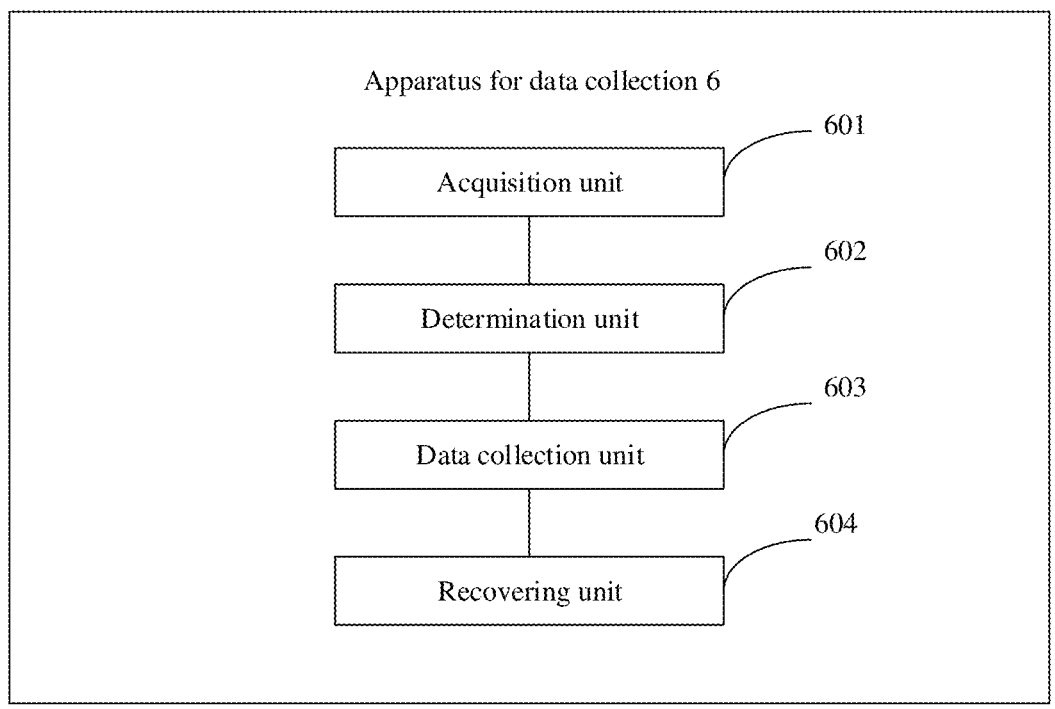
FIG. 6 is a schematic structural diagram of an apparatus for data collection provided in an embodiment of the disclosure.

An embodiment of the disclosure provides an apparatus for data collection, as shown in FIG. 6, which is a schematic structural diagram of an apparatus for data collection provided in an embodiment of the disclosure, the apparatus for data collection includes an acquisition unit 601, a determination unit 602, a data collection unit 603, and a recovery unit 604.

The acquisition unit 601 is configured to acquire use information of storage units in a storage unit cluster within a current scheduling period, here the use information includes a collection state and a historical collection time.

The determination unit 602 is configured to determine at least one first storage unit which is not in a data collection state from the storage unit cluster, based on the collection state.

The determination unit 602 is further configured to determine storage units corresponding to the collection state as second storage units, in case that the collection state indicates that the storage units are in the data collection state.

The determination unit 602 is further configured to determine a target storage unit from the at least one first storage unit, based on the historical collection time.

The data collection unit 603 is configured to stop a data processing service for the target storage unit, perform a data collection operation by the target storage unit, and update a collection state of the target storage unit.

The recovery unit 604 is configured to stop data collection operations of the second storage units, and recover data processing services of the second storage units.

The determination unit 602 is further configured to: take the first storage unit of which the historical collection time is empty, as the target storage unit, here the historical collection time indicates a time when the data collection operation was performed last time; and determine the target storage unit from the at least one first storage unit based on at least one of a storage unit load, a to-be-collected data amount, or a storage unit usage, in case that the historical collection time of the at least one first storage unit is not empty. The use information further includes the storage unit load, the to-be-collected data amount, and the storage unit usage.

The determination unit 602 is further configured to: perform a weighted summation on at least one of the storage unit load, the to-be-collected data amount, or the storage unit usage according to a preset weight, to obtain a weighted value of each of the at least one first storage unit; and determine the target storage unit from the at least one first storage unit according to the weighted value of each of the at least one first storage unit.

The determination unit 602 is further configured to: take first storage units with a maximum weighted value from the at least one first storage unit as candidate storage units, in case that a number of the first storage units with the maximum weighted value is greater than a preset number threshold; and determine the target storage unit based on historical collection times of the candidate storage units.

The determination unit 602 is further configured to: calculate difference values between the historical collection times of the candidate storage units and a current time; and determine the target storage unit from the candidate storage units, based on the difference values.

The recovery unit 604 is configured to: send a collection stopping instruction to the second storage units through a first preset interface, so that the second storage units stop the data collection operations; update a collection state of at least one of the second storage units as being not in the data collection state, and update a historical collection time of at least one of the second storage units; and recover the data processing services of the second storage units.

The determination unit 602 is further configured to determine the storage units as first storage units in case that the collection state indicates being not in the data collection state, the operation state indicates an normal operation, and the to-be-collected data amount is greater than a preset data amount threshold, so that the at least one first storage unit is determined.

The data collection unit 603 is further configured to: send a data collection instruction to the target storage unit through a second preset interface, to stop the data processing service for the target storage unit, and perform the data collection operation by the target storage unit; and update the collection state of the target storage unit as being in the data collection state.

The data collection unit 603 is further configured to enter a next scheduling period after a preset waiting time expires, and perform data collection processes on the storage unit cluster through the next scheduling period, to implement data collection scheduling for the storage unit cluster through at least one scheduling period.

It may be understood that in the above implementation solution of the apparatus, the use information of all the storage units in the cluster are gathered, and then the storage unit which needs to perform the GC operation is determined according to the use information, and the storage unit is temporarily removed from the cluster, and the GC operation is performed after removal. On one hand, removal or addition of storage units is a very common operation for the distributed storage system and does not affect performance of the cluster substantially. On the other hand, since the storage unit has been removed from the cluster during GC, it is unnecessary to consider performance effect of GC on the storage unit at this time. Therefore, in this period of time, the storage unit may perform full-load GC, that is, occupy system resources as much as possible, to perform GC, therefore more storage space may be released.

Figure 7:
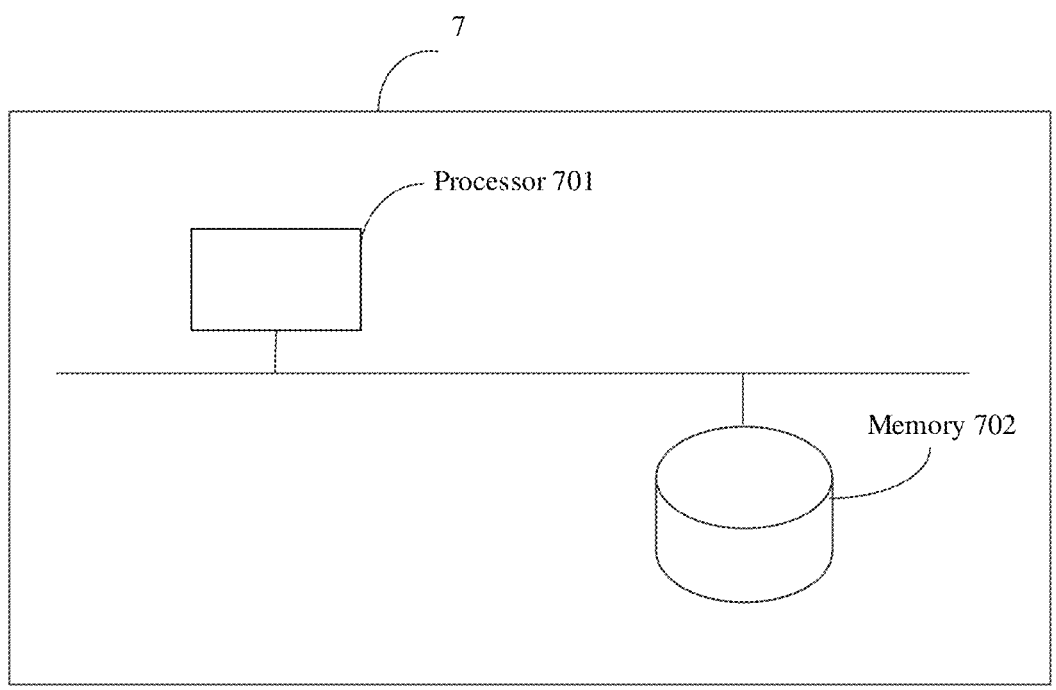
FIG. 7 is a schematic structural diagram of another apparatus for data collection provided in an embodiment of the disclosure.

Based on the methods in the above embodiments, an embodiment of the disclosure provides a schematic structural diagram, as shown in FIG. 7. FIG. 7 is a schematic structural diagram of an apparatus for data collection provided in an embodiment of the disclosure, the apparatus for data collection includes a processor 701 and a memory 702. The memory 702 stores one or more programs which are executable by the processor 701. When one or more programs are executed, the method for data collection corresponding to the foregoing embodiments is executed by the processor 701.

An embodiment of the disclosure provides a computer-readable storage medium, the computer-readable storage medium has stored thereon executable instructions that are configured to when executed by a processor, implement the method for data collection.

It should be understood by those skilled in the art that the embodiments of the disclosure may be provided as methods, systems or computer program products. Therefore, the disclosure may take a form of a hardware embodiment, a software embodiment, or an embodiment combining software and hardware aspects. Furthermore, the disclosure may take a form of a computer program product which is implemented on one or more computer-usable storage media (including, but not limited to a magnetic disk memory, an optical memory, etc.) containing computer-usable program codes therein.

The disclosure is described with reference to flowcharts and/or block diagrams of methods, devices (systems) and computer program products in the embodiments of the disclosure. It should be understood that each process and/or block in the flowcharts and/or block diagrams, and a combination of processes and/or blocks in the flowcharts and/or block diagrams, may be implemented by computer program instructions. These computer program instructions may be provided to a processor of a general purpose computer, a special purpose computer, an embedded processor, or other programmable data processing devices, to generate a machine, so that the instructions executed by the processor of the computer or other programmable data processing devices generate an apparatus configured to implement functions specified in one or more processes of the flowchart and/or one or more blocks of the block diagram.

These computer program instructions may also be stored in a computer-readable memory which may guide the computer or other programmable data processing devices to operate in a specific mode, so that the instructions stored in the computer-readable memory generate a manufactured product including an instruction apparatus, and the instruction apparatus implements functions specified in one or more processes of the flowchart and/or one or more blocks of the block diagram.

These computer program instructions may also be loaded onto the computer or other programmable data processing devices, so that a series of operation steps are performed on the computer or other programmable devices, to generate computer-implemented processes. Therefore, the instructions executed on the computer or other programmable devices provide operations configured to implement functions specified in one or more processes of the flowchart and/or one or more blocks of the block diagram.

The above descriptions are only preferred embodiments of the disclosure, and are not intended to limit the scope of protection of the disclosure.

INDUSTRIAL APPLICABILITY

In the embodiments of the disclosure, the use information of the storage units in the cluster are gathered, and then first storage units and second storage units are determined according to the collection states of the storage units in the use information, and the target storage unit is determined from the first storage units according to the historical collection time, and finally, after the data processing service for the target storage unit is stopped (that is, the target storage unit is removed from the cluster), the data collection operation is performed on the target storage unit. On one hand, removal or addition of storage units does not affect performance of the distributed storage system cluster. On the other hand, since the storage unit has been removed from the cluster during data (garbage) collection, full-load data collection may be performed on the storage unit, so that more storage space are released, and subsequently, the data service of the storage unit may be recovered according to the collection state. In this way, unified scheduling of data collection operations of the storage units is achieved, which may make full use of system resources of the target storage unit, and improve the GC efficiency; furthermore, it may reduce effect on data service performance of the storage cluster when the target storage unit performs the GC operation, thereby improving performance of the storage cluster too.

We claim:

1. A method for data collection, comprising:
acquiring use information of storage units in a storage unit cluster within a current scheduling period, wherein the use information comprises a collection state and a historical collection time;
determining at least one first storage unit which is not in a data collection state from the storage unit cluster, based on the collection state;
determining storage units corresponding to the collection state as second storage units, in case that the collection state indicates that the storage units are in the data collection state;
determining a target storage unit from the at least one first storage unit, based on the historical collection time;
stopping a data processing service for the target storage unit, performing a data collection operation by the target storage unit, and updating a collection state of the target storage unit; and
stopping data collection operations of the second storage units, and recovering data processing services of the second storage units,
wherein the use information further comprises a storage unit load, a to-be-collected data amount, and a storage unit usage,
determining the target storage unit from the at least one first storage unit based on the historical collection time comprises:
taking the first storage unit, of which the historical collection time is empty, as the target storage unit, wherein the historical collection time indicates a time when the data collection operation was performed last time; and
determining the target storage unit from the at least one first storage unit based on at least one of the storage unit load, the to-be-collected data amount, or the storage unit usage, in case that the historical collection time of the at least one first storage unit is not empty.

2. The method of claim 1, wherein determining the target storage unit from the at least one first storage unit based on at least one of the storage unit load, the to-be-collected data amount, or the storage unit usage comprises:
performing a weighted summation on at least one of the storage unit load, the to-be-collected data amount, or the storage unit usage according to a preset weight, to obtain a weighted value of each of the at least one first storage unit; and
determining the target storage unit from the at least one first storage unit according to the weighted value of each of the at least one first storage unit.

3. The method of claim 2, wherein determining the target storage unit from the at least one first storage unit according to the weighted value of each of the at least one first storage unit comprises:
taking first storage units with a highest weighted value as candidate storage units, in case that a number of the first storage units with the highest weighted value from the at least one first storage unit is greater than a preset number threshold; and
determining the target storage unit based on historical collection times of the candidate storage units.

4. The method of claim 3, wherein determining the target storage unit based on the historical collection times of the candidate storage units comprises:
calculating difference values between the historical collection times of the candidate storage units and a current time; and
determining the target storage unit from the candidate storage units, based on the difference values.

5. The method of claim 1, wherein stopping the data collection operations of the second storage units, and recovering the data processing services of the second storage units comprises:
sending a collection stopping instruction to the second storage units through a first preset interface, so that the second storage units stop the data collection operations;
updating a collection state of at least one of the second storage units as being not in the data collection state, and updating a historical collection time of at least one of the second storage units; and
recovering the data processing services of the second storage units.

6. The method of claim 1, wherein the use information further comprises an operation state,
determining at least one first storage unit which is not in the data collection state from the storage unit cluster, based on the collection state comprises:
determining the storage units as first storage units in case that the collection state indicates being not in the data collection state, the operation state indicates a normal operation, and the to-be-collected data amount is greater than a preset data amount threshold, so that the at least one first storage unit is determined.

7. The method of claim 1, wherein stopping the data processing service for the target storage unit, performing the data collection operation by the target storage unit, and updating the collection state of the target storage unit comprises:
sending a data collection instruction to the target storage unit through a second preset interface, to stop the data processing service for the target storage unit, and perform the data collection operation by the target storage unit; and
updating the collection state of the target storage unit as being in the data collection state.

8. The method of claim 1, further comprising:
entering a next scheduling period after a preset waiting time expires, and performing data collection processes on the storage unit cluster through the next scheduling period, to implement data collection scheduling for the storage unit cluster through at least one scheduling period.

9. A system for data collection, comprising a processor and a storage unit cluster, wherein the processor is connected to memory in the storage unit cluster through a preset interface,
the processor is configured to: acquire use information of the memory in the storage unit cluster within a current scheduling period, wherein the use information comprises a collection state and a historical collection time; determine at least one first storage unit which is not in a data collection state from the storage unit cluster, based on the collection state; determine memory corresponding to the collection state as second memory, in case that the collection state indicates that the memory is in the data collection state; determine a target storage unit from the at least one first storage unit, based on the historical collection time; send a data collection instruction to the target storage unit via the preset interface, and update a collection state of the target storage unit; and send a collection stopping instruction to the second memory via the preset interface, and recover data processing services of the second memory, the memory is configured to: stop the data processing service, and perform a data collection operation, in case that the data collection instruction is received; and stop the data collection operation, and start the data processing service accordingly, in case that the collection stopping instruction is received.

10. An apparatus for data collection, comprising:
a memory, configured to store executable instructions; and
a processor, configured to execute the executable instructions to implement:
acquiring use information of storage units in a storage unit cluster within a current scheduling period, wherein the use information comprises a collection state and a historical collection time;
determining at least one first storage unit which is not in a data collection state from the storage unit cluster, based on the collection state;
determining storage units corresponding to the collection state as second storage units, in case that the collection state indicates that the storage units are in the data collection state;
determining a target storage unit from the at least one first storage unit, based on the historical collection time;
stopping a data processing service for the target storage unit, performing a data collection operation by the target storage unit, and updating a collection state of the target storage unit; and
stopping data collection operations of the second storage units, and recovering data processing services of the second storage units,
wherein the use information further comprises a storage unit load, a to-be-collected data amount, and a storage unit usage,
the processor is further configured to execute the executable instructions to implement:
determining the target storage unit from the at least one first storage unit based on the historical collection time by:
taking the first storage unit, of which the historical collection time is empty, as the target storage unit, wherein the historical collection time indicates a time when the data collection operation was performed last time; and
determining the target storage unit from the at least one first storage unit based on at least one of the storage unit load, the to-be-collected data amount, or the storage unit usage, in case that the historical collection time of the at least one first storage unit is not empty.

11. The apparatus of claim 10, wherein the processor is further configured to execute the executable instructions to implement:
determining the target storage unit from the at least one first storage unit based on at least one of the storage unit load, the to-be-collected data amount, or the storage unit usage by:
performing a weighted summation on at least one of the storage unit load, the to-be-collected data amount, or the storage unit usage according to a preset weight, to obtain a weighted value of each of the at least one first storage unit; and
determining the target storage unit from the at least one first storage unit according to the weighted value of each of the at least one first storage unit.

12. The apparatus of claim 11, wherein the processor is further configured to execute the executable instructions to implement:
determining the target storage unit from the at least one first storage unit according to the weighted value of each of the at least one first storage unit by:
taking first storage units with a highest weighted value as candidate storage units, in case that a number of the first storage units with the highest weighted value from the at least one first storage unit is greater than a preset number threshold; and
determining the target storage unit based on historical collection times of the candidate storage units.

13. The apparatus of claim 12, wherein the processor is further configured to execute the executable instructions to implement:
determining the target storage unit based on the historical collection times of the candidate storage units by:
calculating difference values between the historical collection times of the candidate storage units and a current time; and
determining the target storage unit from the candidate storage units, based on the difference values.

14. The apparatus of claim 10, wherein the processor is further configured to execute the executable instructions to implement:
stopping the data collection operations of the second storage units, and recovering the data processing services of the second storage units by:
sending a collection stopping instruction to the second storage units through a first preset interface, so that the second storage units stop the data collection operations;
updating a collection state of at least one of the second storage units as being not in the data collection state, and updating a historical collection time of at least one of the second storage units; and
recovering the data processing services of the second storage units.

15. The apparatus of claim 10, wherein the use information further comprises an operation state,
wherein the processor is further configured to execute the executable instructions to implement:
determining at least one first storage unit which is not in the data collection state from the storage unit cluster, based on the collection state by:
determining the storage units as first storage units in case that the collection state indicates being not in the data collection state, the operation state indicates a normal operation, and the to-be-collected data amount is greater than a preset data amount threshold, so that the at least one first storage unit is determined.

16. The apparatus of claim 10, wherein the processor is further configured to execute the executable instructions to implement:
stopping the data processing service for the target storage unit, performing the data collection operation by the target storage unit, and updating the collection state of the target storage unit by:

sending a data collection instruction to the target storage unit through a second preset interface, to stop the data processing service for the target storage unit, and perform the data collection operation by the target storage unit; and updating the collection state of the target storage unit as being in the data collection state.

17. The apparatus of claim 10, wherein the processor is further configured to execute the executable instructions to implement:

entering a next scheduling period after a preset waiting time expires, and performing data collection processes on the storage unit cluster through the next scheduling period, to implement data collection scheduling for the storage unit cluster through at least one scheduling period.

* * * * *